Feb. 15, 1927.
H. J. COHEN
1,617,376
SIGNAL SWITCH
Filed Oct. 11, 1924

Inventor:
Herbert J. Cohen
By Milo B. Stevens Co.
Attorneys

Patented Feb. 15, 1927.

1,617,376

UNITED STATES PATENT OFFICE.

HERBERT J. COHEN, OF CHICAGO, ILLINOIS.

SIGNAL SWITCH.

Application filed October 11, 1924. Serial No. 743,131.

This invention relates to signals especially adapted for use on automobiles.

Briefly stated, an important object of this invention is to provide an automobile signal having novel means whereby the movement of the transversely extending rod of the steering mechanism may be utilized to close either one of a pair of circuits which will in turn illuminate a signal at the rear of the vehicle to promptly indicate the direction in which the vehicle is being turned.

A further object is to provide a novel form of switch for use in connection with the improved signal and which may be conveniently applied to the vehicle without altering the construction of the same and without the exercise of unusual skill.

Also, an important aim of the invention is to provide a signal of the character specified which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a plan view of a portion of a vehicle equipped with the improved signal.

Figure 4 is a detail transverse sectional view taken on line 4—4 of Figure 2.

Figure 1:
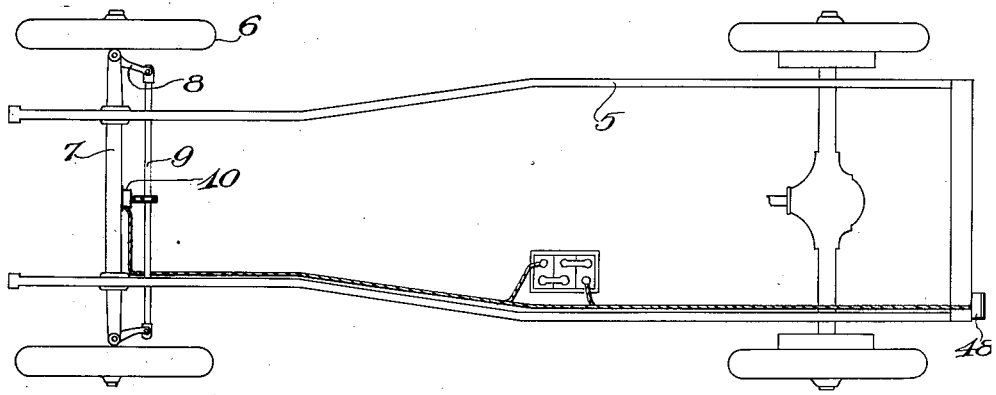

In the drawing wherein for the purpose of illustration is shown a preferred embodiment of the invention the numeral 5 designates an automobile chassis having the usual front wheels 6 connected to an axle 7. Figure 1 illustrates that the wheels 6 have connection with steering arms 8 which are joined for movement together by means of a transversely extending tie rod 9.

Figure 2:
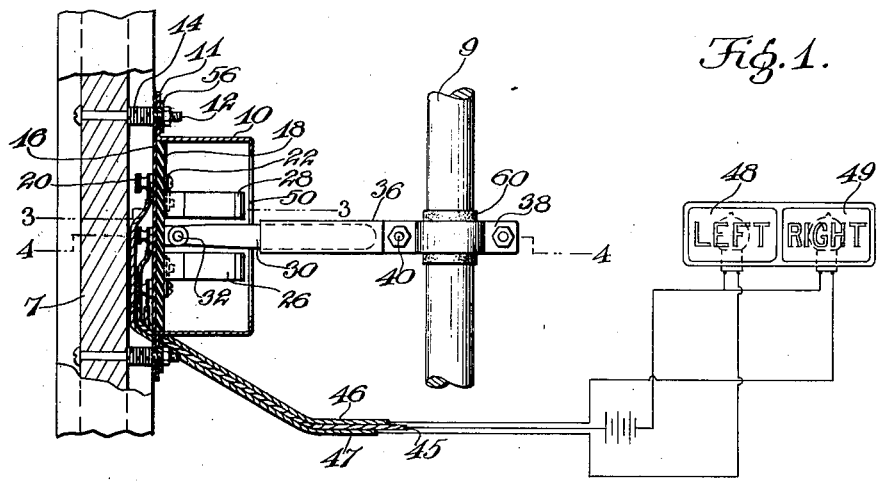
Figure 2 is a horizontal sectional view through the switch applied, the diagram for use in connection with the invention also being illustrated.

The movement of the tie rod 9 transversely of the vehicle is utilized to complete a circuit through a switch mounted on the axle 7 and consisting of a casing 10 of suitable material. Figure 2 plainly illustrates that the ends of the casing are provided with attaching ears 11 through which fastening bolts 12 are extended. The fastening bolts are extended through the web of the axle 7 and are provided with a suitable number of spacing elements 14 in the nature of spring washers or the like. The washers 14 space the casing 10 and the electrical conductors carried thereby a proper distance from the axle. A base member 16 of insulating material is also supported by the bolts 12. It will be seen with reference to Figure 2 that a second insulating strip or layer 18 is arranged within the casing and lies flatly in contact with the insulating base 16 to form a support for a plurality of binding posts 20, the inner ends of which have connection with conductor strips 22.

Figure 3:
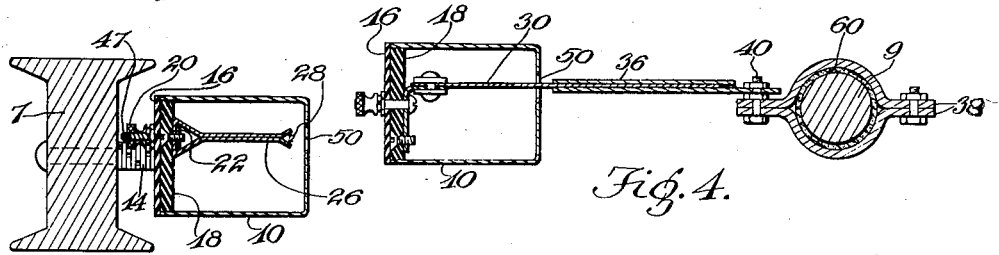
Figure 3 is a detail sectional view taken on line 3—3 of Figure 2.

Figures 2 and 3 plainly illustrate that the transversely extending conductor strips 22 are engaged with the inner portions of leaf spring contacts 26, the outer portions of which are arranged in diverging relation to each other as indicated at 28 to form gradually restricted entrance openings for the reception of a switch blade lever 30 pivoted at its inner end as indicated at 32 to one of the binding posts 20.

In carrying out the invention the outer portion of the blade 30 is slidably positioned in a sheath 36 carried by a two-part clamp 38 mounted on the adjacent portion of the tie rod 9. When the tie rod 9 is operated the two-part clamp 38 will be moved transversely of the switch and will therefore operate the blade 30 to engage either one of the pair of leaf spring contacts 26. Of course the sheath 36 is pivotally connected to the two-part clamp as indicated at 40 so that the sheath may move slightly with relation to the tie rod when the tie rod is operated.

The circuit is clearly illustrated in Figure 2 and consists of the feed wire 45 and wires 46 and 47. The wires 46 and 47 lead to signal casings 48 and 49 respectively so that when the blade 30 is operated either one of the switch casings will be illuminated to indicate the fact that the vehicle is making a turn. This provides a highly responsive signal.

In operation the signal casings 48 and 49 are mounted at the rear of the vehicle as illustrated and when the vehicle is making a turn, or in fact as soon as the wheels are turned, one or the other of the signal casings 48 and 49 will be turned to indicate this. Thus the turning of the vehicle is indicated even before the body of the vehicle begins to turn.

In carrying out the invention an ordinary two-wire circuit may be employed, but the frame of the car may be used as one side of the circuit to make it a single wire circuit if desired.

Figures 2 and 3 plainly illustrate that the blade 30 moves through a slot 50 in the front wall of the casing and is therefore not in any way restricted in its travel.

Also, Figure 2 illustrates that the bolt 12 is spaced from electrical contact with the metallic ears 11 by means of insulating washers 56. This effectively prevents a short circuit.

I have found that the clamp 38 may be securely held on the tie rod 9 by the aid of adhesive tape 60 which may be wrapped around the tie rod at the place where the clamp is to be connected. When the clamp is applied the adhesive tape will naturally compress to some extent and the clamp will remain in place.

Having thus described the invention, what is claimed is:—

1. A switch for use on automobiles comprising a casing having its ends formed with ears, bolts for connecting said ears to an automobile axle, spacing elements on said bolts for spacing the case from the axle, a layer of insulating material closing one side of the casing and supported by said bolts, leaf spring contacts secured within said casing, a switch blade pivoted between said leaf spring contacts, a sheath slidably receiving the blade, and a clamp for connecting the sheath to the tie rod of an automobile, said sheath being pivotally connected to said clamp.

2. A switch for use on automobiles comprising a casing, bolts pivotally connecting the casing to an axle of the automobile, means spacing the casing from the axle, a base member of insulating material mounted on said bolts, binding posts carried by said base member, leaf spring contacts having connection with said binding posts, a switch blade pivoted between said contacts, said casing being provided with a slot receiving said blade, a sheath slidably receiving said blade, a clamp having pivotal connection with said sheath and adapted for connection with a tie rod of an automobile.

In testimony whereof I affix my signature.

HERBERT J. COHEN.